US012005895B2

(12) United States Patent
Münning et al.

(10) Patent No.: US 12,005,895 B2
(45) Date of Patent: Jun. 11, 2024

(54) LATERAL CONTROL OF A VEHICLE BY MEANS OF ENVIRONMENT DATA DETECTED FROM OTHER VEHICLES

(71) Applicant: Volkswagen Aktiengesellschaft, Wolfsburg (DE)

(72) Inventors: Daniel Münning, Braunschweig (DE); Hendrik Oschlies, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 33 days.

(21) Appl. No.: 17/639,548

(22) PCT Filed: Jul. 28, 2020

(86) PCT No.: PCT/EP2020/071260
§ 371 (c)(1),
(2) Date: Mar. 1, 2022

(87) PCT Pub. No.: WO2021/043507
PCT Pub. Date: Mar. 11, 2021

(65) Prior Publication Data
US 2022/0332316 A1 Oct. 20, 2022

(30) Foreign Application Priority Data

Sep. 2, 2019 (DE) .......................... 102019213185.9

(51) Int. Cl.
*B60W 30/10* (2006.01)
(52) U.S. Cl.
CPC ......... *B60W 30/10* (2013.01); *B60W 2552/53* (2020.02); *B60W 2556/10* (2020.02);
(Continued)

(58) Field of Classification Search
CPC ............. B60W 30/10; B60W 2552/53; B60W 2556/10; B60W 2556/20; B60W 2556/25;
(Continued)

(56) References Cited

U.S. PATENT DOCUMENTS 8,798,841 B1 * 8/2014 Nickolaou ......... B62D 15/0265
701/28
9,862,382 B2 * 1/2018 Nakamura .......... B60W 30/095
(Continued)

FOREIGN PATENT DOCUMENTS

DE          10349631 A1    5/2005
DE      102016215643 A1    8/2017
(Continued)

OTHER PUBLICATIONS

Jurk Reinhard, Aug. 23, 2016, English Machine Translation_DE102016215825A1 provided by Patent Translate by EPO and Google (Year: 2016).*
(Continued)

*Primary Examiner* — Peter D Nolan
*Assistant Examiner* — Ashley L Redhead, Jr.
(74) *Attorney, Agent, or Firm* — Peter Zura; LOZA & LOZA, LLP

(57) ABSTRACT

Technologies and techniques for the lateral control of a vehicle. Environment data of a vehicle is detected when travelling a route, and stored environment data, detected when travelling the route by a plurality of other vehicles not currently travelling the route, is received. The plausibility of the stored environment data is checked on the basis of the environment data detected. Lateral control of the vehicle is executed on the basis of the environment data checked for plausibility.

20 Claims, 1 Drawing Sheet

(52) U.S. Cl.
CPC ..... *B60W 2556/20* (2020.02); *B60W 2556/25* (2020.02); *B60W 2556/35* (2020.02); *B60W 2556/45* (2020.02)

(58) Field of Classification Search
CPC ......... B60W 2556/35; B60W 2556/45; B60W 2556/05
See application file for complete search history.

(56) References Cited

U.S. PATENT DOCUMENTS

| | | | | |
|---|---|---|---|---|
| 10,611,374 | B2* | 4/2020 | Sato | B60W 40/06 |
| 11,077,854 | B2* | 8/2021 | Um | B60W 30/18163 |
| 11,084,490 | B2* | 8/2021 | Kim | B60W 30/18163 |
| 11,173,912 | B2* | 11/2021 | Yoo | B60W 30/143 |
| 11,529,956 | B2* | 12/2022 | Kim | B60W 30/18163 |
| 11,541,889 | B2* | 1/2023 | Um | B60W 50/10 |
| 11,680,822 | B2* | 6/2023 | Igarashi | G01C 21/3804 |
| | | | | 701/450 |
| 2016/0090100 | A1* | 3/2016 | Oyama | B62D 15/025 |
| | | | | 701/23 |
| 2017/0248959 | A1* | 8/2017 | Matsubara | B60W 30/095 |
| 2018/0025235 | A1 | 1/2018 | Fridman | |
| 2019/0051179 | A1* | 2/2019 | Alvarez | H04W 4/46 |
| 2020/0111363 | A1* | 4/2020 | Maeda | G08G 1/0145 |
| 2021/0097408 | A1* | 4/2021 | Sicconi | G06N 20/00 |
| 2021/0179138 | A1* | 6/2021 | Terazawa | G01C 21/3476 |
| 2022/0135039 | A1* | 5/2022 | Jardine | B60W 30/18159 |
| | | | | 701/26 |
| 2022/0212673 | A1* | 7/2022 | Satake | B60W 30/12 |
| 2023/0083504 | A1* | 3/2023 | Burns | B60R 25/305 |
| | | | | 705/4 |
| 2023/0368673 | A1* | 11/2023 | Rusciano | G08G 1/202 |

FOREIGN PATENT DOCUMENTS

| | | |
|---|---|---|
| DE | 102016215825 A1 * | 3/2018 |
| DE | 102016215825 A1 | 3/2018 |
| DE | 102017221932 A1 | 6/2019 |
| WO | 2018229552 A2 | 12/2018 |

OTHER PUBLICATIONS

PCT/EP2020/071260 International Search Report (Nov. 16, 2020).

* cited by examiner

LATERAL CONTROL OF A VEHICLE BY MEANS OF ENVIRONMENT DATA DETECTED FROM OTHER VEHICLES

RELATED APPLICATIONS

The present application claims priority to International Patent App. No. PCT/EP2020/071260 to Münning, et al., titled "Lateral Control of a Vehicle by Means of Environment Data Detected From Other Vehicles", filed Jul. 28, 2020, which claims priority to German Patent App. No. 10 2019 213 185.9, to Münning, et al., filed on Sep. 2, 2019, the contents of each being incorporated by reference in their entirety herein.

TECHNICAL FIELD

The present disclosure relates to a method and to a system for laterally controlling a vehicle, in particular a motor vehicle, such as a passenger car or a truck.

BACKGROUND

A variety of driver assistance systems are used in modern vehicles, and in particular in motor vehicles. These often allow a driver-autonomous control of, for example, movements of the vehicle and/or driver-autonomous interventions in the vehicle operation, for example for adapting a speed or a steering angle. One example is what is known as a lane-keeping assistance system. In a manner which is known per se, the course of a roadway (or traffic lane) situated ahead of the vehicle is detected by way of sensors. Thereafter, it is ensured that the vehicle does not inadvertently depart from this roadway, for example as a result of driver-autonomous counter-steering when a roadway boundary is reached.

To provide such functions, the environment of the vehicle is detected by way of sensors. In the process, what are known as "environment data" is obtained. The environment data contains pieces of information, which can be evaluated or are evaluated, about the environment, and in particular about predetermined properties of the environment. For example, the data can indicate the course and/or the coordinates of roadway boundaries along a roadway section situated ahead. One option for detecting the environment data is camera sensors, in which the desired environment properties can be ascertained from the detected camera images by means of an image evaluation.

A typical field of application of the driver assistance functions described here and/or of the driver-autonomous control of a vehicle based on environment data is the lateral control of the vehicle. This can be understood to mean, for example, that the vehicle is to be maintained in position and/or guided in a desired manner, and in particular in a driver-autonomous manner, in a lateral direction (which generally extends horizontally and laterally with respect to a vehicle longitudinal axis). For example, a permissible movement corridor in the lateral direction can be predefined, which corresponds to a width of the roadway. Within the scope of the lateral control, care can be taken to ensure that no departure from this (virtual) movement corridor occurs. If such a departure is nonetheless imminent, a driver-autonomous steering intervention can be carried out within the scope of the lateral control. Solutions, and in particular control devices, and furthermore in particular controllers that enable such a lateral control, are available in the market.

The reliable detection of the environment data by way of sensors, however, may not always be successful in certain situations. For example, the sensor may fail, be soiled, or be subject to other malfunctions. In addition, the environment properties to be detected may not always be discernible, for example when the roadway is dirty or other ambient conditions are present, which cannot be interpreted, or at least cannot be correctly interpreted, based on the sensor data.

A need therefore exists to improve the lateral control of vehicles, in particular with respect to a detection of the environment by way of sensors which is not always reliable.

SUMMARY

Aspects of the present disclosure are directed to methods and systems comprising features recited in the accompanying independent claims. Advantageous refinements are stated in the dependent claims. It shall be understood that all of the introductory features and embodiments can also be provided in the present solution or apply thereto.

In principle, a solution according to the present disclosure provides that the lateral control is not solely limited to data detected by way of sensors. Instead, data from other vehicles which already traveled the same path in the past is also to be taken into consideration.

In particular, so-called swarm data may be resorted to, which includes and stores data of a plurality of vehicles over an extended period of time. This stored data (especially environment data) is used as a kind of reference, since it indicates the form in which the environment along a current path was already detected by other vehicles. In this respect, sensor data of the vehicle itself, and in particular environment data, can be compared to the stored environment data.

In some examples, the stored data can be checked for accuracy/plausibility or, in other words, be verified, based on the own detected sensor data. In general, it may then be established that the environment data that was already stored, provided it has been checked for plausibility, is used in addition to or as an alternative to the environment data detected by the vehicle for laterally controlling the vehicle (in a driver-autonomous manner). If the plausibility check is unsuccessful and, for example, the stored environment data deviates significantly from the environment data detected by way of sensors, in contrast, taking this stored environment data for the (driver-autonomous) lateral control can be dispensed with. Instead, the sensor data of the vehicle itself can then be used, for example to respond to short-term changes in the environment.

One advantage is that the plurality of previously detected environment data which, as expected, has a high and/or previously verified accuracy, can be used by default for a lateral control of the vehicle (if plausible). This data can be prioritized over the detections made by the vehicle itself by way of sensors, which may be prone to errors and less accurate. On the other hand, it is possible to respond to short-term changes in the vehicle environment which were not yet detected by the vehicles that previously traveled the path, since it is then possible to switch to the environment data that is being detected by the vehicle currently traveling the path. Such a discrepancy between the stored and detected environment data can result in a failure of the plausibility check, whereupon the environment data detected by the vehicle itself is then preferably selected by default.

Overall, a solution is provided, in which the more accurate environment data, or also the environment data less prone to errors, is automatically selected with a higher likelihood for the lateral control, which increases the operational safety of the vehicle.

In some examples, a method is disclosed for laterally controlling a vehicle, comprising:
- detecting environment data of a vehicle while traveling a path;
- receiving stored environment data which was detected, while traveling the path, by a plurality of other vehicles not currently traveling the path;
- checking the plausibility of the stored environment data based on the detected environment data; and
- carrying out a lateral control of the vehicle (preferably exclusively) based on (or using) the (stored) environment data checked for plausibility.

The environment data can, for example, relate to data regarding a roadway environment and, in particular, to a roadway section situated ahead. The data can indicate and/or denote environment properties described hereafter. The detection advantageously takes place in a driver-autonomous manner, for example by means of detection sensors. For example, a camera, an ultrasonic sensor, a LIDAR sensor or the like can be used as detection sensors.

Any environment data described herein can be provided with location information. In this way, it is possible to infer the location at which the corresponding environment information or environment data was ascertained. The data can be digital data sets and/or be stored in electric or digital memory devices.

Environment data can be output data of sensors for environment detection or be ascertained based on such output data (or output signals). For example, the environment data can be data about predetermined environment properties, wherein these environment properties are ascertained from image data (as output data) of a camera sensor. This ascertainment can, in general, be carried out by a control device or control unit of the vehicle, as the storage of the detected environment data can be. In principle, any method steps or method measures described herein can be carried out by a control device of the vehicle, as will be described in more detail hereafter.

The stored environment data can be stored in a memory device of the vehicle. For example, this can be a navigation memory or, in other words, the memory of a navigation device. In addition or as an alternative, the environment data can be stored in a vehicle-external memory device, for example on a server (and in particular a cloud server). The vehicle can then access this server selectively or as needed, and request the environment data relevant for the currently traveled, planned or likely path. A communication link to the vehicle-external memory device, and in particular to the server, can generally be not hard-wired. It can, in particular, be a mobile communication link or an Internet connection. At least a portion of the environment data stored external to the vehicle can be buffered in the vehicle. This portion can be the environment data related to a currently traveled, planned or likely path.

The stored environment data can already be at least partially pre-evaluated. For example, it can be an average value for a predetermined environment property which is ascertained from all stored environment data that was transmitted by individual vehicles. Such an evaluation of expended values and/or average values regarding predetermined environment properties based on the overall stored or, in other words, collected or accumulated environment data can, in principle, also take place in the vehicle itself. The coordinates of predetermined environment features, such as a center line or a roadway boundary, can be an environment property.

It is thus possible to store raw data and/or previously evaluated data as environment data.

The vehicles that detected and supplied the stored environment data may currently not travel the path. Rather, it can be a vehicle fleet or a vehicle population that previously traveled the path in the past. This can, in particular, take place over an extended period of time of several days, weeks or months. In this way, a collection of environment data, detected over an extended period of time, is generated by a plurality of vehicles, which serves as a kind of knowledge base or knowledge database for the detection of the environment. This differs from solutions in which data detected by way of sensors is exclusively exchanged between vehicles that are currently located in the same environment and are traveling a shared path. Such a real-time data exchange requires a further vehicle to be in fact present in the environment. If this is not the case, it is not possible to achieve any improvement in driving safety. Moreover, it is possible for the problem to arise that this further vehicle suffers from the same problems of the environment during the detection by way of sensors as the host vehicle, for example due to heavy snowfall or a dirty road. As a result, it is not always ensured that, even when a further vehicle is present in the environment, the environment data detected thereby is qualitatively better than the environment data detected by the host vehicle.

However, it is also possible according to the present disclosure, for example, in addition to stored environment data, to take environment data of other vehicles into consideration which are currently likewise traveling the same path.

Checking the plausibility of the stored environment data based on the detected environment data can encompass a comparison of the data to one another. In particular, at least one environment property of this environment data can be compared to one another.

When referring to environment data in the plural, this does not necessarily mean that a multitude of environment properties have to be detected. In some examples, it is also possible to only detect one environment property which, however, is continuously detected as a function of the location and/or along a path situated ahead. Since this location-dependent environment property is thus updated multiple times when the path is traveled, a corresponding multitude of individual environment data is also obtained while the path is being traveled (for example, data about an environment property present at each considered location or path section situated ahead).

In some examples, a deviation of the stored environment data can be ascertained when carrying out a plausibility check with the detected environment data. The greater the deviation, the sooner the stored environment data is assessed as not being plausible. In particular, a maximum permissible deviation threshold value can be defined, which must not be exceeded for a plausibility check. As will be describe below, comparisons and/or deviations can take place based on quantified variables which are described in the environment data, but are described thereby, wherein these can, in particular, be the aforementioned environment properties.

In some examples, a system is disclosed for laterally controlling a vehicle, comprising:
a detection device for detecting environment data of the vehicle, and a control device, which is configured to:

check the plausibility of stored environment data, which was detected by a multitude of other vehicles while traveling a path, based on the detected environment data; and carry out a lateral control of the vehicle based on the environment data checked for plausibility.

Generally speaking, the system can comprise any further feature and any further component to provide and/or carry out all of the functions, operating states, defects, steps and measures described herein. Generally speaking, the system can be configured to carry out a method according to any of the type described herein. In particular, all refinements of and embodiments regarding the method features can also apply to the equivalent system features and/or be provided therein.

BRIEF DESCRIPTION OF THE DRAWINGS

Aspects of the present disclosure will be described hereafter based on the accompanying schematic figures.

DETAILED DESCRIPTION

Figure 2:
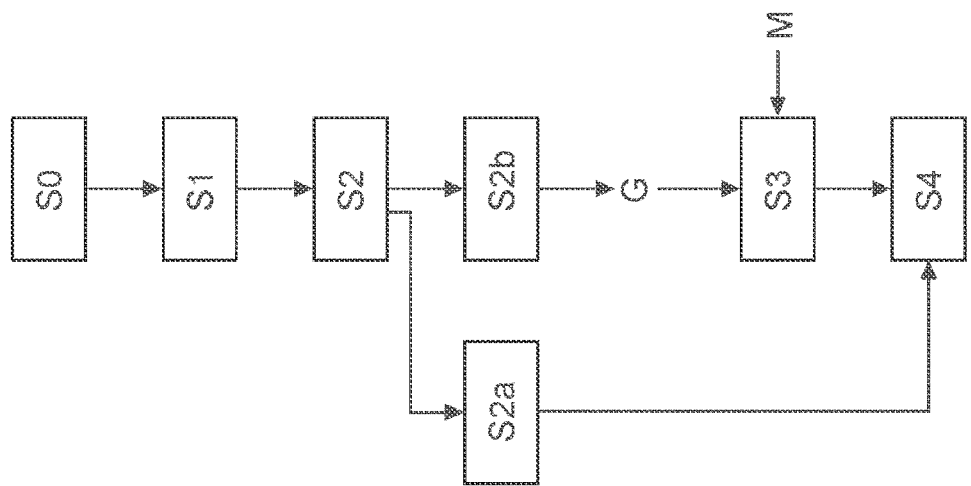
FIG. 2 shows a flow chart of the method, which is carried out by the system from FIG. 1 under some aspects of the present disclosure.

Hereafter, identical reference signs can be used across the figures for identical or like-acting features.

In some examples, a vehicle can generally be laterally controlled in a driver-autonomous manner. In particular, the aforementioned control can take place for this purpose within a permissible movement corridor, including potential driver-autonomous steering interventions. Known control algorithms can be employed so as to ascertain an impermissible lateral movement of the vehicle based on current movement variables and, if necessary, to initiate (driver-autonomous) counter-measures based thereon. Carrying out the lateral control based on the environment data that has been checked for plausibility (or, in the following case, based on the environment data detected by the vehicle) can comprise that a permissible movement corridor is defined based on the environment data, and/or at least one boundary in the lateral direction that is not to be crossed. For example, roadway markings or roadway boundaries can be ascertained based on the environment data, and these can define a maximum permissible position in the lateral direction for the vehicle.

Within the scope of the lateral control, it can accordingly be monitored whether the vehicle is at risk of crossing this boundary, and it is then possible, for example, to counter-steer in a driver-autonomous manner.

In some examples, the stored environment data is swarm data. Swarm data can be understood to mean data that was detected by a plurality of vehicles (for example, more than 10, or more than 100) over a time period of a multitude of days (for example, at least 10, at least 30 or at least 365), or over a multitude of trips along the path. The plurality of these vehicles can operate independently of one another, but can nonetheless be referred to, in summary, as a fleet or swarm. The environment data individually detected in each case by the vehicles of the fleet or of the swarm together, that is, overall, can be referred to as swarm data, and can preferably be accordingly stored together and/or collectively, for example, in a central database. A shared feature of the vehicles is that they traveled the same path, which can be ascertained based on location information of the environment data. As a result, within the swarm data, environment data is available for a plurality of trips along the path. The vehicles have preferably ascertained environment data about preferably shared predetermined environment properties. The swarm data can also be stored external to the vehicle, for example, on above-described servers.

In some examples, (preferably only) the environment data detected by the vehicle is used or, in other words, taken into consideration as environment data for the lateral control when the plausibility check fails (for example, since a quality of the detected environment data does not meet a required minimum quality).

In general, a plausibility check within the scope of the present disclosure can be understood to mean that a quality of the environment data and/or of the data's meaningfulness, ability to be taken into consideration, accuracy or general usability is ascertained and confirmed. Within the scope of the present disclosure, the detected environment data can serve as a reference for this purpose.

If the plausibility check of the stored environment data fails, this may be an indication that short-term changes, for example, arose along the driving route. For safety reasons, it is then possible to switch to the environment data detected by the vehicle.

In some examples, the environment data relates to different environment properties, and a dedicated plausibility check is carried out for each environment property. The lateral control of the vehicle can consequently be carried out based on the environment properties that have been checked for plausibility. In contrast, the environment properties that were not checked for plausibility can be detected by the vehicle, so that mixed forms of stored environment properties and detected environment properties can be used for laterally controlling the vehicle, depending on the result of the plausibility check. This increases the safety and the accuracy, since it is checked separately for each property whether the property actually reflects the current state.

In general, it can be provided that an environment property that is detected by way of the environment data, or that is ascertained therefrom, is one of the following:

a left roadway marking or roadway boundary, from the view of the vehicle (that is, in the driving direction);

a right roadway marking or roadway boundary, from the view of the vehicle; and/or at least one outer roadway edge.

Herein, a roadway can also be understood to mean a single traffic lane of a multi-lane street or of a multi-lane road. A roadway marking can, accordingly, be a traffic lane marking. A roadway marking can, in general, be a center marking or an edge marking, which can be applied to the roadway surface in the customary manner. The roadway boundary can be a physical obstacle, which can prevent a departure from the roadway at least locally, or it can represent a collision obstacle for the departure from the roadway, for example, in the form of a bollard, a guide post, or a guard rail.

An outer roadway edge can correspond to a road edge and/or a transition region to, for example, an unpaved environment.

In some examples, pieces of information about a route traveled by the further vehicles are also stored. These pieces of information are preferably used for the purpose of checking the plausibility of the stored environment data using environment data detected by the vehicle. For example, it is possible to consider only environment data of those vehicles that traveled along the same or a comparable route (or path). For example, it is possible to check whether a route traveled by the vehicles coincides with a route or course of the roadway that is actually situated ahead according to environment data detected by the (host) vehicle. If this is not the case, the environment data of these corresponding vehicles can remain without consideration or, more precisely, the environment data detected by these vehicles cannot be checked for plausibility.

The pieces of route information can be stored in the form of location coordinates and/or GPS data or other position ascertainment data, or can be defined based thereon.

In some examples, a quality of the stored environment data is ascertained based on the detected environment data for the plausibility check. In particular, it can be ascertained to what extent the environment data agrees with the detected environment data and/or deviates therefrom. As a function thereof, the quality of the stored environment data can then be ascertained. The greater the agreement or the smaller the deviation, the higher the quality can be. In particular, a quantifiable value can be ascertained as quality or, in other words, as a quality criterion. As is described herein, this value can be compared to a minimum quality, which can likewise be defined as a quantifiable value, and only when the minimum quality is met can the environment data be checked for plausibility.

In some examples, it may be provided that the quality is ascertained based on a comparison of the stored environment data and the detected environment data over a defined path section that is preferably situated ahead. Location information for the path section situated ahead can be ascertained from a currently detected position of the vehicle and known detection ranges of the vehicle sensors. It is possible, in general, within the scope of the present invention, for example, to determine a considered roadway section that is situated ahead, for example as to whether the detected environment data is detected within a range of 0 to 20 m, 0 to 40 m, or 0 to 60 m ahead of the vehicle (in the driving direction). Environment data having identical location information can then be ascertained from the stored environment data, and this data can be compared to the detected environment data (situated ahead) along the driving route situated ahead, and in particular within a defined path section situated, for example, 0 to 20 m, or 0 to 40 m ahead. This represents an effective means for establishing impermissible deviations of the stored and detected environment data in a timely manner.

The present disclosure can furthermore provide that a minimum quality is ascertained, which the stored environment data must meet to be considered to be plausible or assessed as being plausible. The minimum quality can be ascertained as a function of at least one of the following features or variables:

A path section length situated ahead of the vehicle, within which detected environment data is compared to stored environment data. In the process, it may be taken into consideration, for example, whether a detection range for environment data situated ahead is 0 to 20 m, 0 to 40 m, or 0 to 60 m. The larger the path section situated ahead or the considered path length situated ahead, the lower the requirements can be that are placed on the minimum quality. This is based on the idea that detections in ranges that are situated far ahead or located far away from the vehicle may be less accurate than in ranges closer to the vehicle. The smaller the aforementioned path section size or length, the greater the requirements can be that are placed on the minimum quality to be met. Generally speaking, the minimum quality can define, and in particular quantify, a minimum agreement to be met, or a permissible maximum deviation from the stored and detected environment data. High requirements with regard to the minimum quality can be synonymous with low permissible deviations, or with a high required agreement. Low requirements with regard to the minimum quality can be synonymous with a high permissible deviation and low agreement.

A kind of the environment property, which are detected as (or within the scope of the) environment data and compared. In the process, consideration may be given to the accuracy with which the corresponding properties are detectable in the first place. For example, the detection of roadway boundaries or roadway markings may be easier than that of a roadway edge (for example, the transition from asphalt to nature). The higher a theoretically detectable accuracy of the environment property, the higher the requirements with regard to the minimum quality to be met can be. The lower this accuracy, the lower the requirements with regard to the minimum quality can be.

The detection conditions during the detection of the environment data, wherein this can, in particular, be aimed at the environment data detected by the vehicle. The detection conditions can be ascertained by vehicle sensors. This can be, for example, a brightness, precipitation, a visibility range, general visibility conditions or roadway soiling. The detection conditions can be stored as integral parts of the environment data and/or as additional information. If the detection conditions are to be considered to be critical, that is, they do not allow a highly accurate detection of the environment, which is something that can be automatically ascertained by a control device of the vehicle and/or accordingly assessed, accordingly low requirements can apply with regard to the minimum quality. On the other hand, the requirements with regard to the minimum quality can be increased when the detection conditions are not critical.

A region within which the vehicle is situated. This can be a geographical region, which is defined, for example, based on geographical properties and/or map data. However, this can also be a radius of a predetermined number of kilometers. It can be ascertained, for this region, to what extent stored environment data is available and/or what the quality of the environment data in this region. has been (historically). If the region is characterized by a small amount of stored environment data and/or a low quality of this environment data, the requirements with regard to the minimum quality to be met can be accordingly low since, in general, a high detection uncertainty is to be assumed. On the other hand, the requirements with regard to the minimum quality can be increased when a plurality of stored environment data exists and/or a high quality exists in this region.

A historical quality of the stored environment data. In the process, previously ascertained qualities of the environment data can be considered, regardless of a connection with certain regions and, for example, with respect to the currently considered vehicle and/or driving route. If these qualities are comparatively high, the requirements with regard to the minimum quality can be increased, and otherwise they can be reduced.

A property of the comparison carried out for ascertaining the quality. Here, for example, a generally expected accuracy of the comparison method that is used and/or of a (for example, statistical) accuracy variable established in the process can be considered. In general, the requirements with regard to the minimum quality can be reduced in the case of less precise method or methods prone to errors. For example, different (in particular lower) requirements with regard to the minimum quality to be met can apply during a comparison based on least squares than during a general consideration of the correlation between stored and detected environment data. Using the least squares method, a constant deviation of the data (for example, a parallel offset of detected and stored courses of the roadway) is known to lead to high deviations, which can be assessed as not being very accurate. The correlation can be influenced less heavily by such a constant deviation, and can therefore preferably be attended by higher requirements with regard to the minimum quality. Another example of a comparison method is the ascertainment of the Hausdorff distance during which, similarly to the correlation, high minimum quality requirements can apply.

In some examples, depending on the number of considered variables, the minimum quality can be a multi-dimensional characteristic map or can be ascertained based thereon, wherein the dimension is determined, for example, by the number of variables. The variables can be weighted or weightable. The weighting can be flexibility adaptable. In this way, a minimum quality can be ascertained, for example based on a linear combination of possibly weighted individual values, wherein an individual value is, in each case, ascertained as and/or based on an individual variable. The individual value can be a scale value, which is obtained as a function of current values of a corresponding variable (for example, an evaluation scale of the historical quality from 0 (unusable) to 10 (very good)).

In general, it may also be provided that stored environment data are only regarded as valid for a limited time. When a maximum permissible age is exceeded, the data can preferably be essentially automatically assessed, without considering further (for example, quality) properties, as not being plausible.

In some examples, the control device disclosed herein can be distributed in the vehicle and, for example, include multiple individual control components and/or control units, or access these. However, it can also be a single structurally and/or functionally integrated control device of the vehicle. The environment data can be accessed by accessing a vehicle bus, which is connected to the control device and the detection device. The detected environment data can be processed by the control device and/or the detection device, for example so as to determine the environment properties to be detected, as described herein. So as to be able to access the stored environment data, the control device can access a vehicle-external memory device (for example, via a mobile communication link) or can read this environment data from an (intermediate) memory of the vehicle, for example, when the data is buffered in the vehicle after having been read out from a vehicle-external memory. Generally speaking, the control device can thus be configured to read out, request and/or receive the stored environment data, in particular by or from a vehicle-external memory device. For checking the plausibility of the stored environment data, a comparison of any of the type described above can be carried out, for example, and/or a quality of the stored environment data, and preferably also a minimum quality to be met, can be ascertained by the control device.

For carrying out the lateral control of the vehicle, the control device can provide known control functions, and in particular use the environment data for establishing lateral positions not to be crossed and/or for defining a permissible (virtual) movement corridor. The control device can furthermore compare current lateral positions of the vehicle to a corresponding movement corridor or a general movement boundary and, when there is a risk that this corridor is departed from or this boundary is crossed, can initiate driver-autonomous counter-measures, and in particular driver-autonomous steering interventions.

Figure 1:
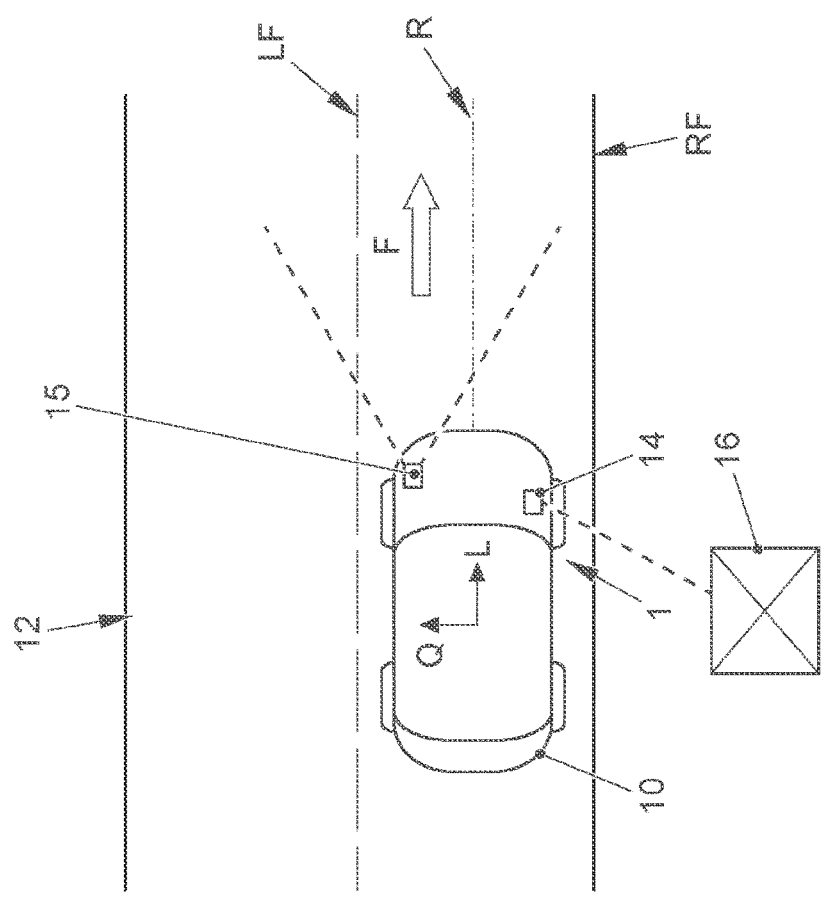
FIG. 1 shows a vehicle, comprising a system for carrying out methods according to some aspects of the present disclosure.

Turning to FIG. 1, the drawing shows a vehicle 10, which is driving along a road 12 (or also path) in the driving direction F. The vehicle 10 comprises a system 1 according to some aspects of the present disclosure. The system 1 comprises a control device 14, which is designed as a single control unit in the shown example. The control unit 14 is wirelessly connected to a vehicle-external server, and more precisely, to a cloud server 16, by way of a mobile communication link.

The system 1 may also include a detection device 15, which is a camera sensor in the shown example. The camera sensor is arranged in the vehicle 10 so as to detect a road section situated ahead, and to output image data of the road according to a detection frequency. This image data can be evaluated in the camera sensor itself, or by the control device 14, and more particularly such that predetermined environment properties are ascertained therein.

These environment properties are a left roadway boundary LF and a right roadway boundary RF, as seen from the view of the vehicle and in the driving direction F. In the shown case, a roadway is equated to a single traffic lane for the vehicle 10. The left roadway boundary LF is a center marking, and the right roadway boundary RF is an edge marking. The right roadway boundary RF can also be marked by a transition region of the road 12 to the environment or nature.

The control device 14 may also be configured to ascertain a current vehicle position, for example based on GPS data or other position detection data. The environment properties LF, RF can accordingly be stored in a location-based or location-dependent manner. This can take place in a memory device (not shown) of the control device 14.

Generally speaking, the control device 14 may include at least one processor device, and in particular a computer processor. This processor device can execute program instructions which, for example, are stored in a memory device (likewise not shown) of the control device 14. The execution of these program instructions can prompt the control device to carry out or prompt all the functions and/or steps and/or measures described herein.

Within the scope of the present disclosure, it is generally possible, and not limited to further details of the exemplary embodiments, to ascertain and to store position information, and in particular in the lateral direction, of the ascertained environment properties, and in particular of the roadway boundaries LF, RF in an absolute and/or vehicle-external coordinate system. For this purpose, GPS coordinates or other global coordinates can be resorted to, for example. It is thus possible to ascertain and store coordinates of the detected roadway boundaries LF, RF in an absolute (for example, global), coordinate system, preferably for each vehicle location, in principle, however, also independently thereof.

A route R is also shown, which the vehicle has yet to cover in the shown state. The route R can be ascertained based on the actual vehicle positions of the vehicle that exist when the vehicle 10 is driving along the road 12.

In some examples, the shown solution presupposes that several other vehicles have already traveled along a comparable route R in the past along the road 12, and in the process detected the same environment properties LF, RF. It is further presupposed that these vehicles transmitted the corresponding environment data to the vehicle-external memory device 16. There, this environment data can be stored, for example, in a location-dependent manner, as was described above in general terms. It is also possible to store the actually covered driving routes R of the particular vehicles.

If the currently considered vehicle 10 is driving along the road 12, the currently detected environment data can, in each case, be ascertained by the detection device 16 or control device 14. Likewise, however, it is possible for the stored environment data of those vehicles to be ascertained from the memory device 16 which previously traveled the road 12 in this region (that is, in the same route section). Relevant environment data can be ascertained, for example, based on the covered routes R and/or a vehicle position, which should agree as much as possible with the position and route R of the vehicle 10 currently traveling the road 12.

Thereafter, the stored environment data is compared to the currently detected environment data. Specifically, each of the considered environment properties LF, RF is individually compared to the corresponding stored environment properties. If it is established in the process that the stored environment data, and more precisely, environment properties, do not correspond to those currently detected, which can be established by the control device 14 by carrying out corresponding comparison and evaluation steps, the stored environment data can be assessed as not being plausible. Instead, the currently detected environment data, and preferably, exclusively the detected environment data, can then be used for the lateral control. If, in contrast, plausibility is established, the stored environment data and preferably, exclusively the stored environment data, can be used for the lateral control.

This procedure is explained further in the example of FIG. 2 based on a flow chart. In a step S0, which can be carried out continuously and is an optional integral part of the method according to the present disclosure, a plurality of environment data detected by vehicles of a (swarm) population or fleet is stored in a location-dependent manner in the vehicle-external memory device 16. In a step S1, a road 12 is then traveled by a specific vehicle 10. In the process, this vehicle 10 likewise continuously detects environment data, and in particular the same environment properties LF, RF that the vehicles whose environment data was stored in the vehicle-external memory device 16 already detected.

In a step S2, the stored environment data is read out or requested by the control device 14 as a function of a current location of the vehicle 10. Thereafter, at least one, or also arbitrary combinations of the plausibility measures described hereafter can be carried out.

Initially, it can optionally be ascertained whether a route R of those vehicles which generated the corresponding stored environment data agrees with the route R situated ahead of the currently considered vehicle 10. For this purpose, information about route R can be stored during the detection of the stored environment data as an integral part of the stored environment data and can be ascertained by the control device 14. A current route R can, for example, be ascertained based on known image evaluation algorithms, in particular as a center line between the left and right roadway boundaries LF, RF. The comparison between a route R situated ahead according to stored environment data (or swarm data) and a detected route R situated ahead is carried out in FIG. 2 in step S2a. When sufficient agreement is established, the environment data can be assessed as being plausible. An agreement can be expressed, for example, as a deviation in the horizontal plane and/or in location coordinates of the corresponding routes R, or can be ascertained based thereon.

In addition or as an alternative, the respective ascertained environment properties LF, RF can be compared in a step S2b to the currently detected environment properties LF, RF. For this purpose, for example, a coordinate value of the left roadway boundary LF, as detected by the detection device 16, can be recorded over a certain driving distance. Furthermore, the coordinate value of this roadway boundary LF can be ascertained for the same route section from the stored environment data. Figuratively speaking, two graphs can be generated in this way, and a correlation and/or a distance between these graphs can be assessed.

For example, mathematical comparison methods, such as a method of the individual squared errors or a general correlation determination, can be applied to ascertain an agreement (or a deviation) between the stored and the detected environment data, and preferably for each individual environment property. As a result, a quality G of the stored environment data can be ascertained, the quality increasing with decreasing deviation from and/or increasing agreement with the actually detected environment data or environment properties.

In step S3, this quality G can then be used to carry out the actual plausibility check.

For this purpose, preferably first a minimum quality M to be met is ascertained, which can be carried out at any arbitrary point in time and, for example, also prior to step S2b. The minimum quality M makes it possible, in the manner described above in general terms, to establish, as a function of different circumstances, what quality G can realistically be expected for the current driving scenario and/or the general operating situation. If no high accuracy for the detection of environment data is to be expected for the considered location or, generally speaking, for the considered operating situation, the minimum quality M to be met can be selected to be accordingly low. If the contrary is the case, the minimum quality M to be met can be accordingly high.

In step S4, it is then established whether, in step S3, a comparison between the ascertained quality and of the minimum quality M to be met or, in step S2a, the comparison of the route R, has yielded that the stored environment data is plausible or not. If this is not the case, it is established in step S4 that the lateral control of the vehicle by way of the control device 14 is to be carried out based on the environment data detected by the vehicle 10 itself. If, in contrast, the stored environment data was assessed as plausible, the lateral control is carried out by taking the stored environment data into consideration, and preferably, exclusively based on the stored environment data, and not based on the currently detected data.

LIST OF REFERENCE SIGNS 1 system
10 vehicle
12 road 14 control device
15 detection device
16 vehicle-external memory device
F driving direction
LF left roadway boundary
RF right roadway boundary
G quality
M minimum quality
R route

The invention claimed is:

1. A method for laterally controlling a vehicle, comprising:
   detecting environment data of a vehicle while traveling a path;
   receiving stored environment data that was detected, while traveling the path, by a plurality of other vehicles that have traveled the path previously in time relative to the vehicle, wherein the stored environment data comprises swarm data;
   checking the plausibility of the stored environment data based on a configured deviation threshold value determined from a comparison of variables between the stored environment data and the detected environment data; and
   executing a lateral control of the vehicle based on the checked environment data.

2. The method according to claim 1, wherein checking the plausibility of the stored environment data comprises utilizing a multi-dimensional characteristic map comprising weighted variables.

3. The method according to claim 1, wherein, if the plausibility check fails, the detected environment is used as environment data for executing the lateral control.

4. The method according to claim 1, wherein the environment data comprises data relating to different environment properties, and a dedicated plausibility check is carried out for each environment property.

5. The method according to claim 1, wherein detecting environment data comprises detecting at least one of the following environment properties:
   a left roadway marking (LF) or roadway boundary, from the view of the vehicle;
   a right roadway marking (RF) or roadway boundary, from the view of the vehicle;
   at least one outer roadway edge.

6. The method according to claim 1, further comprising storing information about a route traveled by the further vehicles, and using the stored information about the route traveled by the further vehicles for checking the plausibility of the stored environment data.

7. The method according to claim 1, further comprising ascertaining a quality of the stored environment data, based on the detected environment data for the plausibility check,
   wherein the quality is based on a comparison between the stored environment data and the detected environment data along a defined route section.

8. The method according to claim 1, further comprising ascertaining a minimum quality, which the stored environment data must meet to pass the plausibility check.

9. The method according to claim 8, wherein the minimum quality is ascertained as a function of at least one of the following:
   a route section length situated ahead of the vehicle, within which detected environment data is compared to stored environment data;
   a kind of environment property, which is detected as environment data and compared;
   detection conditions during the detection of the environment data;
   a region within which the vehicle is situated;
   a property of the comparison carried out for ascertaining the quality;
   a historical quality of the stored environment data.

10. A system for laterally controlling a vehicle, comprising:
    a detection device for detecting environment data of the vehicle; and
    a control device, operatively coupled to the detection device, wherein the detection device and/or control device are configured to
    detect environment data of a vehicle while traveling a path;
    receive stored environment data that was detected, while traveling the path, by a plurality of other vehicles that have traveled the path previously in time relative to the vehicle, wherein the stored environment data comprises swarm data;
    check the plausibility of the stored environment data based on a configured deviation threshold value determined from a comparison of variables between the stored environment data and the detected environment data; and
    execute a lateral control of the vehicle based on the checked environment data.

11. The system according to claim 10, wherein the detection device and/or control device are configured to check the plausibility of the stored environment data by utilizing a multi-dimensional characteristic map comprising weighted variables.

12. The system according to claim 10, wherein, if the plausibility check fails, the detected environment is used as environment data for executing the lateral control.

13. The system according to claim 10, wherein the environment data comprises data relating to different environment properties, and a dedicated plausibility check is carried out for each environment property.

14. The system according to claim 10, wherein detecting environment data comprises detecting at least one of the following environment properties:
    a left roadway marking (LF) or roadway boundary, from the view of the vehicle;
    a right roadway marking (RF) or roadway boundary, from the view of the vehicle;
    at least one outer roadway edge.

15. The system according to claim 10, wherein the detection device and/or control device are configured to store information about a route traveled by the further vehicles, and use the stored information about the route traveled by the further vehicles for checking the plausibility of the stored environment data.

16. The system according to claim 10, wherein the detection device and/or control device are configured to ascertain a quality of the stored environment data, based on the detected environment data for the plausibility check, wherein the quality is based on a comparison between the stored environment data and the detected environment data along a defined route section.

17. The system according to claim 10, wherein the detection device and/or control device are configured to ascertain a minimum quality, which the stored environment data must meet to pass the plausibility check.

18. The system according to claim 17, wherein the minimum quality is ascertained as a function of at least one of the following:

a route section length situated ahead of the vehicle, within which detected environment data is compared to stored environment data;

a kind of environment property, which is detected as environment data and compared;

detection conditions during the detection of the environment data;

a region within which the vehicle is situated;

a property of the comparison carried out for ascertaining the quality;

a historical quality of the stored environment data.

19. Computer program instructions for laterally controlling a vehicle, which, when executed by a detection device and control device of the vehicle, cause the control device to:

detect environment data of a vehicle while traveling a path;

receive stored environment data that was detected, while traveling the path, by a plurality of other vehicles that have traveled the path previously in time relative to the vehicle, wherein the stored environment data comprises swarm data;

check the plausibility of the stored environment data based on a configured deviation threshold value determined from a comparison of variables between the stored environment data and the detected environment data; and execute a lateral control of the vehicle based on the checked environment data.

20. The computer program according to claim 19, wherein checking the plausibility of the stored environment data comprises utilizing a multi-dimensional characteristic map comprising weighted variables.

* * * * *